Sept. 28, 1948.  J. A. HEIDBRINK  2,450,338
VALVE STRUCTURE FOR CONTROLLING
FLOW OF GASES THROUGH ABSORBERS
Filed Sept. 3, 1946  2 Sheets-Sheet 1
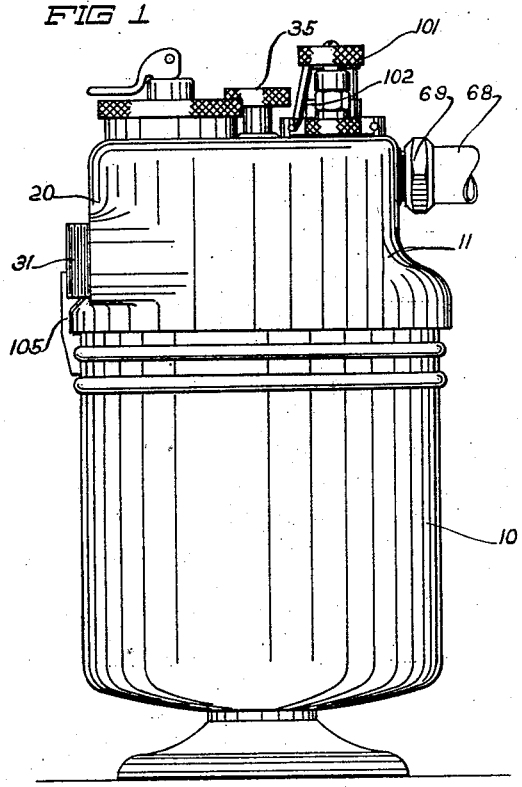
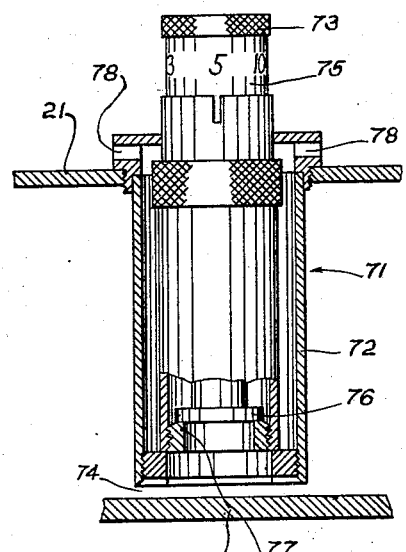
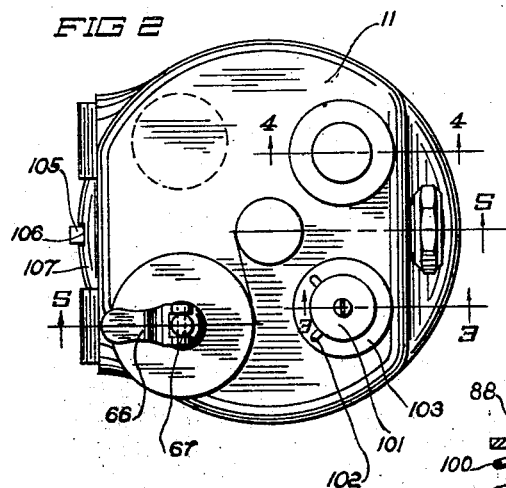
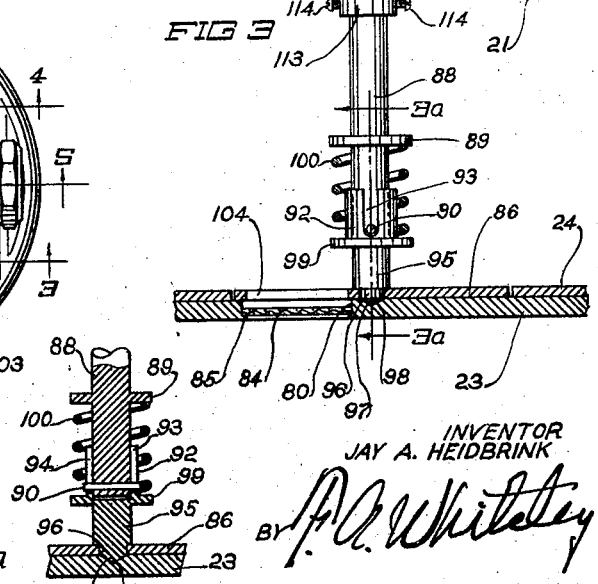
INVENTOR
JAY A. HEIDBRINK
ATTORNEY

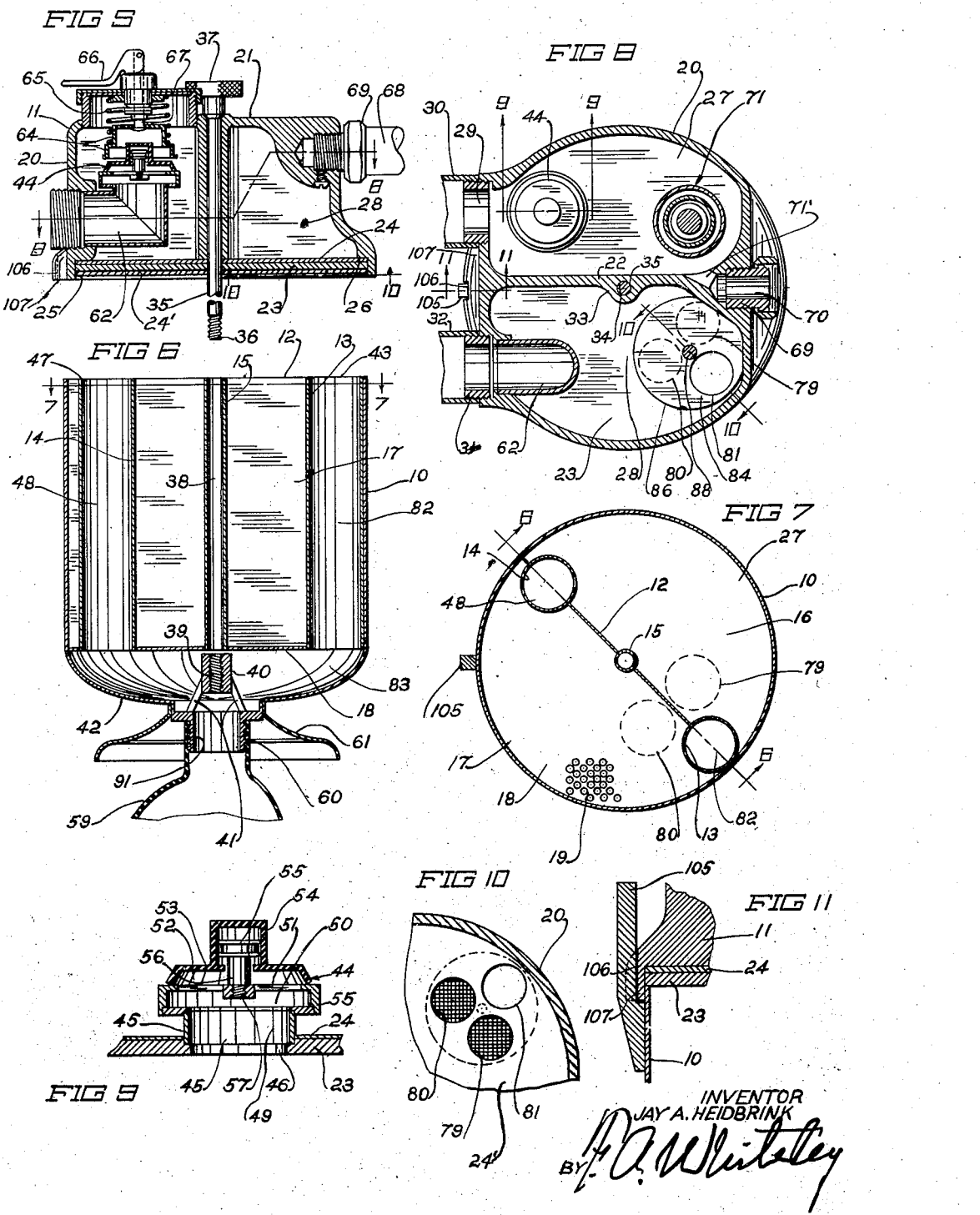

Patented Sept. 28, 1948

2,450,338

UNITED STATES PATENT OFFICE 2,450,338

VALVE STRUCTURE FOR CONTROLLING FLOW OF GASES THROUGH ABSORBERS

Jay A. Heidbrink, Minneapolis, Minn., assignor to Air Reduction Company, Incorporated, New York, N. Y., a corporation of New York Application September 3, 1946, Serial No. 694,528

5 Claims. (Cl. 128—191)

My invention relates to valve structure for controlling flow of gases through absorbers, and has for its object to provide an absorber formed with an upper portion having two chambers into which the inhalation and exhalation gases respectively flow, to provide a multiple-chamber canister for holding a carbon dioxide absorbing agent such as soda lime, the chambers being separate one from the other, and to provide valve means whereby at the will of the operator the exhalation gases can be passed through one or the other of said soda lime chambers, through both simultaneously, or through neither of them.

In the use of carbon dioxide absorbers in a closed breathing line it frequently happens that there is need for a quick shift from one container of absorber material such as soda lime to another such container or to a pair of them, or to cut out the soda lime entirely. Great difficulty has been experienced because with the character of valves employed the soda lime would get between the movable and immovable surfaces of the valves heretofore employed and the valve would stick and could not be operated.

It also sometimes happens that it may be desirable to pass the exhalation gases through two or more containers of absorber material simultaneously, particularly when the soda lime in all such containers may have been depleted in efficiency; and there are conditions when it is desirable to cut out the soda lime entirely and employ only oxygen with waste of exhalation gases to the outer air at the mask.

When the absorbers are cut out entirely it also is sometimes desirable to permit pressure to build up in the breathing line without waste to exhalation gases, for example for expanding a collapsed lung, and it may also be desirable to permit the amount of carbon dioxide in the closed breathing circuit to be substantially increased for stimulation of respiration.

It has been found, however, to be also particularly desirable to have the soda lime containers compactly arranged with adaptability for quick shift from one to the other or quick operation in other ways. Difficulties have been encountered in all of the above noted matters.

I have discovered a simple and effective means of providing separated chambers for the soda lime in a single casing in combination with means for controlling the flow of gases by a single valve structure, having pointer means, such that by merely turning this valve mechanism the gases of exhalation may be passed through any of the soda lime chambers independently, through all of them simultaneously or through none of them.

In connection with these means, I have also discovered a way of forming the valve by means of a flat disk engaging a flat surface dividing the exhalation chamber from the upper part of the soda lime containers, this disk being yieldingly held upon the surface in such manner that accidental introduction of films of soda lime between the contacting surfaces of the valve disk and of the division plate can not have the effect of causing the valve to stick, so it is always available for operation. This is an essential and important feature of my invention.

It is a principal object of my invention, therefore, to provide a single casing member, preferably cylindrical, which will be divided by suitable partitions into two or more chambers, to provide a casting to which the casing is readily and removably secured, which is formed with a pair of separated chambers, one from which inhalation takes place, and one to which exhalation goes; and to form in the exhalation chamber openings through its bottom wall to the several chambers, which will contain absorber material such as soda lime, with a flat disk valve held for free rotation not subject to sticking for controlling the several openings.

It is a further object of my invention to provide for additions of oxygen to the inhalation chambers in combination with pressure safety valve means and check valve means such that the oxygen together with rebreathed gases from the rebreathing bag will go to the patient in the inhalation stream.

It is a further object of my invention to provide the exhalation side of the closed breathing line as it enters the other or exhalation chamber with normal ordinary check valve means.

It is a further object of my invention to provide the last-named check valve means with a locking device extending outside the casting for preventing exhalation gases to go through the absorber mechanism in any way, but to waste to atmosphere whenever it is deemed desirable to break the closed breathing line and breath only fresh oxygen, and to build up pressure to the lungs when that is deemed desirable.

It is a further object of my invention to provide ports from the exhalation chamber in the casting which will individually lead to the several soda lime chambers and the soda lime therein, and to provide in conjunction with said ports a flat disk valve member which is spring-held against the bottom wall of the exhalation chamber over said ports, and which, by a simple rotative movement thereof, may be made to open said ports individually and completely or to open a plurality of said ports taken together without any danger of sticking because of films of soda lime between contacting surfaces of valve and bottom wall.

It is a further object of my invention to provide port means from the exhalation chamber controlled by the aforesaid valve which will cause the exhalation gases to by-pass the soda lime entirely, and, with controlled delivery of oxygen to the inhalation side of the apparatus, with sufficient waste of exhalation gases to maintain suitable enrichment of oxygen in the inhalation stream, or to build up increased pressure in the breathing line and an increase of carbon dioxide where either is called for.

It is a further object of my invention to construct the members making up my absorber mechanism in a manner so they may be disassembled and reassembled very quickly for the purpose of replacing used soda lime in the chambers or any of them with fresh soda lime.

The full objects and advantages of my invention will appear in connection with the detailed description thereof, which will be given in detail in the following specification, and the novel features of my invention by means of which the aforesaid useful and advantageous results are obtained will be particularly pointed out in the claims.

In the drawings illustrating an application of my invention in one of its forms:

Fig. 1 is a side elevation view of my complete absorber mechanism and its controlling parts.

Fig. 2 is a top plan view of the same.

Fig. 3 is a part sectional side elevation view taken on line 3—3 of Fig. 2 on an enlarged scale.

Fig. 3a is a sectional elevation taken on line 3a—3a of Fig. 3.

Fig. 4 is a part sectional elevation view taken on line 4—4 of Fig. 2.

Fig. 5 is a sectional elevation view of the top casing taken on line 5—5 of Fig. 2.

Fig. 6 is a sectional elevation view taken on line 6—6 of Fig. 7.

Fig. 7 is a transverse sectional plan view taken on line 7—7 of Fig. 6.

Fig. 8 is a sectional plan view taken on line 8—8 of Fig. 5.

Fig. 9 is a sectional elevation fragmentary view taken on line 9—9 of Fig. 8.

Fig. 10 is a longitudinal fragmentary view taken on line 10—10 of Fig. 5.

Fig. 11 is a sectional view on an enlarged scale taken on line 11—11 of Fig. 8.

As illustrated I provide two members, a canister casing 10 and a casting 11. The canister casing has a central partition 12, Fig. 7, which is formed with a pair of vertical tubular passageways 13 and 14 and a central tubular opening 15. This central partition divides the space within canister 10 into two vertical chambers 16 and 17, Figs. 6 and 7. Partition 12 and chambers 16 and 17 extend to a bottom screen member 18 which is provided with a multiplicity of perforations 19 and extends over the entire bottom of the two chambers 16 and 17.

The tubular members 13, 14 and 15 each extend through the bottom member 18. The casting 11 is formed with a generally cylindrical outer wall 20, a top wall 21 and a transverse partition 22. The bottom of the casting is closed by a plate 23 which, with a pair of sealing gaskets 24 and 24' on each side of it, is pressed into an annular space 25 against an annular ledge 26 to seal the space within the casting 11.

This space is divided into two chambers 27 and 28 by the partition 22, these chambers being separated and entirely out of direct communication one with the other.

The chamber 27 is connected with an outlet nipple 29 which in turn is connected with an inhalation tube 30. The chamber 28 similarly is connected with an exhalation tube 32. The inhalation and exhalation tubes go to a suitable mask construction not shown and with the breathing chamber in the mask construction and other passageways hereafter to be described establish a closed breathing line.

The partition 22 has an expanded portion 33 in which is formed a vertical cylindrical opening 34 adapted to receive the stem 35 of a member having a screw-threaded lower end 36 and a knurled hand nut 37 which extends outside of casting 11.

As best shown by comparison of Figs. 5 and 6, juxtaposed one above the other, the stem 35 is adapted to extend through cylindrical opening 38 in the cylindrical member 15, and the threaded part 36 of stem 35 will screw into the threaded portion 39 within a stud 40 which is connected to and supported by spaced arms 41. These in turn are connected with the downwardly curved bottom member 42 of the canister 10.

As shown in Figs. 5 and 7 in section the canister 10 is circular and the space 25 is likewise circular and of a diameter to receive the upper edge 43 of the canister 10, which engages directly the gasket 24'.

The bottom plate 23 is not permanently fastened into annular space 25 but is held positioned against the annular ledge 26, with the sealing gasket 24 between it and the annular ledge 26, and the sealing gasket 24' between it and the upper edge 43, by means of the thumb nut arrangement 35, 36 and 37, the part 36 being screwed into the threaded portion 39 of member 40.

This arrangement makes it readily practical not only to withdraw the canister 10 for discharge of used soda lime and refilling the chambers 16 and 17 with fresh soda lime, but also makes possible easy opening of the chambers 27 and 28 within casting 11 for inspection, cleaning, repair and the like.

Within inhalation chamber 27 is a check valve 44 illustrated in detail in Fig. 9. This comprises a cylindrical extension 45 which surrounds an opening 46 that registers with the upper edge 47 of tubular member 14 and in effect amounts to an extension of the passageway 48 through said tubular member.

The passageway 49 through annular extension 45 communicates with a valve chamber 50 which, through openings 51 from chamber 50, in turn communicates with the chamber 52 under the check valve 53. This check valve has a cylindrical cap portion 54 adapted to slide on guide rings 55 formed on a stud 56 which is centrally secured at 57 upon the member 58 that forms the chamber 50, as shown in Fig. 9.

It follows that when negative pressure from inhalation is produced in chamber 27 the check valve member, designated generally by the numeral 44 and specifically by the numeral 53, will rise to permit flow of inhalation gas to pass through passageway 48 from the rebreathing bag 59 held upon depending connector member 60, which is held within the supporting foot 61 formed in conjunction with the bottom wall 42 of canister 10.

Within chamber 28 is an elbow passageway 62 which connects with the nipple 31 and the exhalation tube 32 as shown in Fig. 5. The passageway 62 connects with check valve mechanism 44 described in detail with reference to Fig. 9.

In this construction, however, an annular member 64 surrounded by spring 65 is normally held positioned so that the check valve 63 may be raised by the pressure of exhalation.

When, however, it is desired to cut off the exhalation through the soda lime in one or the other or both or all the containers thereof, a cam lever 66 pivotally connected with a stem 67 will be swung to an upward position to release the spring 65 to hold the member 64 in position to prevent lifting of the check valve 63.

This arrangement is employed with a customary exhalation release mask construction, not shown, which permits escape of exhalation gas from the mask, so when the lever 66 is thrown up exhalation through the apparatus to the rebreathing bag 59 will be terminated.

Oxygen from any suitable source will be supplied by tubing 68 to a connector plug 69 which through an opening 70 therein and an opening 71' through the partition 22 gets the oxygen to the inhalation chamber. The control of rate of flow of oxygen is determined by well-known means, not shown.

A safety valve designated generally by the numeral 71 is positioned within the inhalation chamber 27 and is shown somewhat in detail in Fig. 4. This is a standard weight type pressure limiting valve which is shown mounted in a cylindrical casing 72 with a knurled head 17 which by turning determines the pressure of release. The gas flows under the edge of the valve at 74 and according to the pressure indicated upon the scale 75 will lift the valve 76 from the valve seat 77 and allow discharge of gas above the top plate 21 through openings 78.

This arrangement, of course, is for protection against excessive pressure which might be built up when the valves are set to cut out the absorbers and the mask valve for escape of exhalation is retained closed or partly closed.

As has been stated, exhalation gases go directly from the mask structure through tube 32 and passageway 62 to discharge past check valve 63 into exhalation chamber 28. Means are provided which are readily controllable for routing the exhalation gases from chamber 28 in any one of four different routes.

As shown in dotted lines in Figs. 7 and 10, there are a plurality of openings through the bottom plate 23. Specifically these openings, designated by suitable reference numerals, are opening 79 which leads to soda lime chamber 16, opening 80 which leads to soda lime chamber 17, and opening 81 which leads to the passageway 82 in the tubular member 13, which passageway discharges into a chamber 83 formed within the base portion 42 of the canister 10.

The openings 79 and 80 are each covered by a removable screen 84. As shown in Fig. 3, this screen 84 simply rests in the respective openings 79 and 80, being supported and held upon an annular ledge 85 at the bottom thereof.

The purpose of the screen 84 is to prevent the absorber material, such as soda lime, from getting into the exhalation chamber, as it might do without the screen, by reason of the fact that the absorber as an entirety may be so handled as at times to be inverted.

Also shown in Figs. 3 and 8 is a valve disk 86 which rests upon the plate 23 when that plate is held in position. As shown in Fig. 3 the gasket 24 is cut away so that the valve disk 86 contacts directly the plate 23.

Shown in detail in Fig. 3a is a valve stem 88 which carries a disk 89 and a transverse pin 90 at the end 91 of the stem 88. A cup-like enclosing part 92 surrounds the lower end of stem 88 and is provided with slots 93 and 94 on opposite sides thereof.

The cup-like member has secured to it a short extension 95 having the same diameter as the valve stem 88. This extension 95 in turn has a downwardly projecting part 96 which terminates in a conical point fitting in a conical depression 98 in the plate 23. The extension 95 also is provided with a flange plate 99.

Between the flange plates 89 and 99 is a compression spring 100, which at all times exerts a yielding pressure on the stem extensions 95 and 96 and the valve disk 86, which is rigidly secured thereto, thus constantly holding the valve disk with a yielding pressure against the surface of plate 23.

The valve stem 88 has at its upper end a knurled thumb piece 101 and a pointer 102 which registers against a dial 103 with markings thereon (not shown) to indicate the position of the opening 104 in valve disk 86 relative to openings 79, 80 and 81. The valve stem 88, of course, extends through the top plate 21 of casting 11, as clearly shown in Figs. 1 and 2.

The disk 26 overlies the three circular openings 79, 80 and 81 or overlies any larger number of such openings which it might be further desirable to employ. The disk 86 is preferably circular in outline although other shapes are within the scope of my invention and may be employed. It is provided with a circular opening 90 which is of the same diameter as the diameters of the openings 79, 80 and 81.

It follows that by rotation of the valve disk 86 by means of the valve stem 88 the opening 90 in valve disk 86 may be brought to register with any one of the openings 79, 80 and 81, or to register partly with any adjacent pair thereof.

To prevent the spring 100 from pushing up the stem 88 and to permit ready assembly, I provide a collar 113, Fig. 3, below the wall 23 and adapted to engage it under impulsion of spring 100. The collar will be secured in position by set screws 114.

As clearly indicated in Fig. 7, the opening 79 goes to the upper part of chamber 16. The opening 80 goes to the upper part of chamber 17, which chamber is separated from chamber 16 by the partition 12. The opening 81 registers with the end of the passageway 62 in the tube member 13.

As shown in Figs. 3 and 8 the valve opening 90 registers with the opening 80, which, through the screen 84, in turn opens into soda lime chamber 17.

Because of the relation between tube 13 and valve opening 104 and tube 14 and check valve 44, it is essential that when the parts are assembled these members be placed in perfect alignment.

To effect this I provide on the canister an upstanding arm 105 which is not only secured to the canister but extends upwardly therefrom, as shown in Fig. 1 and also in detail in Fig. 11. The arm 105 is adapted to go into a notch 106 in an arcuate piece 107 at the rear of the casting 19, this notch being clearly shown in Figs. 2 and 8. When so positioned the contact of the arm 105 with the walls of the notch 106 will hold the parts in proper alignment.

The advantages of my invention will be apparent from the foregoing description. In an extremely compact yet capacious unit, means are provided for establishing a closed breathing circuit through the mask and the respiratory organs of the wearer of that mask, whereby are provided two or more containers of carbon dioxide absorber materials such as soda lime, the entire arrangement being so related to the position of the soda lime containers, the inhalation and exhalation chambers in the top casting, the tubular passageways leading from the exhalation chamber and to the inhalation chamber, respectively, and the valve structure, that shifting from an opening into one soda lime container or another or into any two soda lime containers may be made instantly at any time and with entirely accurate predetermined positioning of parts.

It is a further great advantage of my invention that the entire construction is securely and simply held together as a unit and yet that it may be broken down into its component parts or reunited out of them by the mere turning of a thumb screw, and that any time union or reunion of the parts is effected they are automatically put into proper alignment for effective operation.

It is a further great advantage of my invention that this ease and simplicity of disassembling the unit into the individual parts releases the soda lime combination of containers for ready removal of the exhausted soda lime and replacement of fresh soda lime.

One of the most pronounced advantages of my invention, however, comes from the fact that the valve disk 86 not only has a flap-engaging surface itself, but engages the flat upper surface of the bottom wall 23 of exhalation chamber 28, and that this engagement is effected by the action of spring 100, so while it is firm and effective for valve adjustment, it is adapted at all times to yield and thus to prevent sticking of the valve caused by soda lime getting into the contacting surface.

I claim:

1. An absorber unit, comprising a canister formed with a plurality of chambers for holding independently of each other a supply of carbon dioxide absorber material such as soda lime, a casting secured to an end of the canister having a bottom wall and a transverse partition to form respective exhalation and inhalation chambers, a separate tube opening through the bottom wall into the exhalation chamber and the inhalation chamber respectively, an independent opening through said bottom wall into each of said absorber chambers, and a valve member in the exhalation chamber adapted to open communication therefrom to each of the absorber chambers or two thereof together.

2. An absorber unit, comprising a canister formed with a plurality of chambers for holding independently of each other a supply of carbon dioxide absorber material such as soda lime, a casting secured to an end of the canister having a bottom wall and a transverse partition to form respective exhalation and inhalation chambers, a separate tube opening through the bottom wall into the exhalation chamber and the inhalation chamber respectively, an independent opening through said bottom wall into each of said absorber chambers, and a valve member in the exhalation chamber having a stem and an operating head extending outside of said exhalation chamber, said valve being operative by the head to open communication from the exhalation chamber to each of the absorber chambers independently or to two thereof together.

3. An absorber unit, comprising a canister formed with a plurality of chambers for holding independently of each other a supply of carbon dioxide absorber material such as soda lime, a casting secured to an end of the canister having a bottom wall and a transverse partition to form respective exhalation and inhalation chambers, a separate tube opening through the bottom wall into the exhalation chamber and the inhalation chamber respectively, an independent opening through said bottom wall into each of said absorber chambers, a rotary valve plate resting on the bottom wall above the openings therethrough and having therein an opening adapted to register with any one or with parts of any pair of said first-named openings, and means extending outside of the casting to operate the valve.

4. An absorber unit, comprising a canister formed with a plurality of chambers for holding independently of each other a supply of carbon dioxide absorber material such as soda lime, a casting secured to an end of the canister having a bottom wall and a transverse partition to form respective exhalation and inhalation chambers, a separate tube opening through the bottom wall into the exhalation chamber and the inhalation chamber respectively, an independent opening through said bottom wall into each of said absorber chambers, a rotary valve plate resting on the bottom wall above the openings therethrough and having therein an opening adapted to register with any one or with parts of any pair of said first-named openings, and a stem and operating head extending outside of said exhalation chamber connected to said valve plate for operating the same.

5. An absorber unit, comprising a canister formed with a plurality of chambers for holding independently of each other a supply of carbon dioxide absorber material such as soda lime, a casting secured to an end of the canister having a bottom wall and a transverse partition to form respective exhalation and inhalation chambers, a separate tube opening through the bottom wall into the exhalation chamber and the inhalation chamber respectively, an independent opening through said bottom wall into each of said absorber chambers, a rotary valve plate resting on the bottom wall above the openings therethrough and having therein an opening adapted to register with any one or with parts of any pair of said first-named openings, a stem and operating head extending outside of said exhalation chamber, slidable means connecting said stem to the valve plate for operating the same, and a spring action between the stem and said slidable means to hold the valve plate in firm yielding engagement with the upper surface of the top as the valve plate is operated.

JAY A. HEIDBRINK.

REFERENCES CITED

The following references are of record in the file of this patent:

UNITED STATES PATENTS

| Number | Name | Date |
| --- | --- | --- |
| 2,354,452 | Foregger | July 25, 1944 |